United States Patent [19]

Masologites

[11] 4,355,999

[45] Oct. 26, 1982

[54] PROCESS FOR AGGLOMERATING COAL

[75] Inventor: George P. Masologites, Columbus, N.C.

[73] Assignee: Atlantic Richfield Company, Philadelphia, Pa.

[21] Appl. No.: 971,157

[22] Filed: Dec. 20, 1978

[51] Int. Cl.³ .......................... C10L 9/00; C10L 5/10
[52] U.S. Cl. ........................................ 44/1 SR; 44/24
[58] Field of Search ...................... 44/1 R, 6, 24; 75/3

[56] References Cited

U.S. PATENT DOCUMENTS

1,512,427  10/1924  Trent ........................................ 44/24
2,543,898  3/1951  De Vaney ................................. 75/3
4,033,729  7/1977  Capes et al. ........................... 44/1 A Primary Examiner—Carl F. Dees
Attorney, Agent, or Firm—John B. Goodman

[57] ABSTRACT

This invention provides a method for reducing the amount of oil required to form coal-oil agglomerates comprising the steps of (a) forming a slurry of water and coal particles; (b) contacting the slurry with an amount of hydrocarbon oil to form coal-oil agglomerates; (c) contacting said agglomerates with an additional amount of coal particles to form coal-oil agglomerates of a desired size; and (d) recovering coal-oil agglomerates of reduced oil content.

11 Claims, No Drawings

PROCESS FOR AGGLOMERATING COAL

BACKGROUND OF THE INVENTION

1. Field of the Invention

This invention relates to a method of agglomerating coal particles with hydrocarbon oil, and more particularly to a method for reducing the amount of hydrocarbon oil required to form coal-hydrocarbon oil agglomerates.

2. Prior Art

Heretofore, it was known that coal particles could be agglomerated with hydrocarbon oils. For example, U.S. Pat. No. 3,856,668 to Shubert issued Dec. 24, 1974, and U.S. Pat. No. 3,665,066 to Capes et al. issued May 25, 1972 disclose processes for recovering coal fines by agglomerating the fine coal particles with oil. U.S. Pat. No. 3,268,071 to Puddington et al. issued Aug. 23, 1966 and U.S. Pat. No. 4,033,729 issued July 5, 1977 to Capes disclose processes for beneficating coal involving agglomerating coal particles with oil in order to provide a separation of coal from ash. While these processes can provide some benefication of coal, improved ash and pyritic sulfur removals would be desirable.

The above U.S. Pat. No. 4,033,729 to Capes et al. relating to removing inorganic materials (ash) from coal significantly notes that pyritic sulfur has proven difficult to remove because of its possible hydrophobic character. This disclosure confirms a long standing problem. The article "The Use of Oil in Cleaning" Chemical and Metallurgical Engineering, Vol. 25, pages 182-188 (1921) discusses in detail cleaning coal by separating ash from coal in a process involving agitating coal-oil-water mixtures, but notes that pyrite is not readily removed in such a process. In such a process, benefication of coal would be greatly improved if pyrite sulfur removal could be enhanced.

While it is known that hydrocarbon oil agglomeration can be useful in recovering coal particles and/or beneficiating coal, the large amount of hydrocarbon oil required in these prior art coal agglomeration processes has detracted from their usefulness. It would be especially advantageous if the amount of hydrocarbon oil could be reduced in forming hydrocarbon oil coal agglomerates.

SUMMARY OF THE INVENTION

This invention provides a method for reducing the amount of oil required to form coal-oil agglomerates comprising the steps of:

(a) forming a slurry of water and coal particles;

(b) contacting the slurry with an amount of hydrocarbon oil to form coal-oil agglomerates;

(c) contacting said agglomerates with an additional amount of coal particles to form coal-oil agglomerates of a desired size; and (d) recovering coal-oil agglomerates of reduced oil content.

It has been discovered that after coal-oil agglomerates are formed, that additional coal particles can be added to the coal-oil agglomerates. The desirable result is that coal-oil agglomerates reduced in oil content are formed. Surprisingly, these coal-oil agglomerates reduced in hydrocarbon oil content can have a size similar to coal-oil agglomerates which when initially formed require a higher oil content.

In another aspect of this invention, a method for beneficiating coal involving this improved agglomeration process is presented.

In another aspect of the invention, a conditioning agent is employed which renders pyrite more amenable to separation on agglomerating coal particles with hydrocarbon oil. In this aspect of the invention, an improved method for beneficiating coal is presented.

DETAILED DESCRIPTION OF THE INVENTION AND ITS PREFERRED EMBODIMENTS

In its broad aspect, this invention provides a method for reducing the amount of hydrocarbon oil required for forming coal-oil agglomerates involving the steps of:

(a) forming a slurry of water and coal particles;

(b) contacting the slurry with an amount of hydrocarbon oil to form coal-oil agglomerates;

(c) contacting said agglomerates with an additional amount of coal particles to form coal-oil agglomerates of a desired size consist; and (d) recovering coal-oil agglomerates of reduced oil content.

This invention involves the discovery that coal-oil agglomerates formed by agitating a mixture of coal particles, hydrocarbon oil and water can accept additional coal particles to form coal-oil agglomerates reduced in oil content.

Suitable coals which can be employed in the process of this invention include brown coal, lignite, subbituminous, bituminous (high volatile, medium volatile, and low volatile), semi-anthracite, and anthracite. In addition, coal refuse from wash plants which have been used to upgrade run-of-mine coal can also be used as a source of coal. Typically, the coal content of a refuse coal will be from about 25 to about 60% by weight of coal. Particularly preferred refuse coals are refuse from the washing of metallurgical coals.

The coal particles employed in this invention can be provided by a variety of known processes, for example, grinding or crushing.

A very suitable coal particle size which is amendable to agglomeration is minus 24 mesh, for example minus 24 mesh and 70% or more on 300 mesh, preferably minus 50 mesh on 200 mesh.

Coal-oil agglomerates can be readily formed by agitating a mixture of water, hydrocarbon oil and coal particles. For example, water and hydrocarbon oil can be added to coal particles of a suitable size to form the mixture. More preferably coal is ground in the presence of water to form a slurry of coal particles and water, and hydrocarbon oil is added to the slurry to form a mixture.

The water content of the mixture is not critical and can vary within wide limits. Generally from about 30% to 95% water, and more preferably from about 40% to 90% water, based on the weight of coal, will be employed. There should be sufficient hydrocarbon oil present to agglomerate the coal particles. The optimum amount of hydrocarbon oil will depend upon the particular hydrocarbon oil employed, the size of the coal particles, and the coal-oil agglomerate size desired. Generally, the amount of hydrocarbon oil initially employed will be from about 10% to 45%, often 15% to 30%, by weight, of coal. The amount of hydrocarbon oil required for forming coil-oil agglomerates generally increases as: (1) the particle size of the coal decreases, and (2) the desired size of the agglomerate increases.

Suitable hydrocarbon oils for forming coal-oil agglomerates are derived from petroleum, shale oil, tar sand and coal. Especially, suitable hydrocarbon oils are light and heavy refined petroleum fractions such as light cycle oil, heavy cycle oil, heavy gas oil, clarified oil, kerosene, heavy vacuum gas oil, residual oils, coal tar and other coal derived oils. Mixtures of various hydrocarbon oils can be quite suitable; particularly when one of the materials is very viscous.

The hydrocarbon oils are hydrophobic and will preferentially wet the hydrophobic coal particles. When the mixture of water, hydrocarbon oil and coal is agitated, the hydrocarbon oil wets (becomes associated with) the coal particles. These hydrocarbon wet coal particles will collide with one another under suitable agitation forming coal-oil agglomerates. In general, the size of the coal-oil agglomerate is generally at least about 2 to 3 times, more generally at least 4 to 10 times, or more of the average size of the coal particles which make up the coal-oil agglomerates.

Agitating a mixture water, hydrocarbon oil and coal particles to form coal-oil agglomerates can be suitably accomplished using stirred tanks, ball mills or other apparatus. An apparatus which provides a zone of shearing agitation is especially suitable for agitating the mixture.

When coal-oil agglomerates are formed in this manner, the coal particles generally take up substantially all of the hydrocarbon oil present forming coal-oil agglomerates of a size characteristic at the given conditions and oil level employed. At a given coal particle size (and other conditions being equal), increasing the amount of oil provides coal-oil agglomerates of increased size.

In forming coal-oil agglomerates, a principal goal is to form coal-oil agglomerates of a size such that the agglomerate can be readily recovered, i.e., preferentially separated from water and minerals (e.g., ash and pyrite) associated with the coal. The desired size of the agglomerate can vary depending on the separation technique which is employed. In order to conserve the valuable hydrocarbon oil, the amount of oil (and agglomerate size) should be as small as possible to provide the desired separation.

In accordance with this invention, it has now been discovered that coal-oil agglomerates of a given size can be formed having a reduced oil content by contacting previously formed coal-oil agglomerates with an additional amount of coal particles. For example, coal particles can be added to a slurry of previously formed coal-oil agglomerates and agitated. The additional coal particles associate with and become a part of the coal-oil agglomermate forming a coal-oil agglomerate reduced in oil content. Surprisingly, this coal-oil agglomerate reduced in oil content can have a size comparable to an initially formed coal-oil agglomerate of higher oil content. This process of adding coal particles to coal-oil agglomerates will be referred to from time to time hereinafter as "back addition."

The process can be very suitably performed at temperatures in the range ambient, e.g. to 200° F., for example 50° F. to 150° F., preferably 50° F. to 100° F., and at a pressure sufficient to maintain the liquids employed.

This process of back addition can often be most advantageously performed in successive stages, i.e., coal-oil agglomerates are recovered, slurried in water, additional coal particles added with agitation to form coal-oil agglomerates reduced in oil content, recovered, slurried in water, additional coal particles added with agitation, to form coal-oil agglomerates (even further) reduced in oil content, etc.

The amount of coal particles which can be back added to coal-oil agglomerates in the process of this invention can vary widely. For example, from about 0.1 to 10 parts, preferably about 0.2 to 5 parts, more preferably 0.3 to 2, by weight, coal particles, will generally be added to one part, by weight, coal-oil agglomerates. The most suitable amount of coal particles added to the coal-oil agglomerates will depend on the oil content of the coal-oil agglomerates and the desired size of the coal-oil agglomerate reduced in oil content.

The additional coal particles can be added to the slurry or coal-oil agglomerates either as "dry" particles or as a slurry of coal particles in water. Generally and preferably, the additional coal particles will be obtained from the same source as the coal particles forming the coal-oil agglomerates such that the coal particles will have substantially the same size or size distribution as the coal particles forming the coal-oil agglomerates, although particles can be obtained from different grinding circuits and different size consist can be employed.

When these coal particles are added to the water slurry of coal-oil agglomerates and agitated, coal-oil agglomerates reduced in oil content are formed. The resulting coal-oil agglomerates in the water slurry can be recovered by separating, for example, by using suitable screens, filters and sieve bands. This separation step also allows for removal of some of the mineral matter, for example, ash, such that the coal is beneficiated.

The recovered coal-oil agglomerates reduced in oil content will most often have from about 1% to 30%, preferably about 2% to 20% and more preferably about 3% to 25% by weight of coal of hydrocarbon oil. Most generally, recovered coal-oil agglomerates reduced in oil content will have from about 3% to 10%, by weight of coal, hydrocarbon oil.

The process of forming coal-oil reduced in oil content agglomerates can be used to recover aqueous slurries of coal fines, and can also be employed to beneficiate coal.

A preferred method of beneficiating coal in accordance with this invention which provides coal-oil agglomerates reduce in oil content involves the following steps:

(1) forming an aqueous slurry of coal particles containing ash and iron pyrite mineral matter, and hydrocarbon oil;

(2) agitating the slurry to form coal-oil agglomerates;

(3) recovering coal-oil agglomerates wherein the coal has reduced mineral content;

(4) forming a mixture of the recovered coal-oil agglomerates, water and an additional amount of coal particles;

(5) agitating the mixture to form coal-oil agglomerates reduced in mineral content; and (6) recovering coal-oil agglomerates of a desired size wherein the coal has reduced mineral content.

If the hydrocarbon oil content of the recovered coal-oil agglomerates from step 6 is not too low, additional coal particles can be added to these coal-oil agglomerates, i.e., steps 4–6 can be repeated, e.g. successively repeated from 1 to 5 times or more. This procedure which involves a step-wise addition of coal particles to coal-oil agglomerates is a preferred aspect of the invention for beneficiating coal. This preferred process can provide good beneficiation of coal, and yet does not require large amounts of hydrocarbon oil.

In an especially preferred aspect of the invention, the coal particles containing ash and iron pyrite mineral matter employed are contacted with at least one conditioning agent which renders pyrite more amenable to separation from the coal particles on forming coal-oil agglomerates. In this preferred aspect of the invention, coal particles are contacted with a promoting amount of at least one conditioning agent capable of modifying or altering the existing surface characteristics of the pyrite under conditions to effectuate alteration or modification of at least a portion of the contained pyritic sulfur. This altered or modified pyritic sulfur is preferentially rejected to the aqueous phase such that recovered coal-oil agglomerates are coal-oil agglomerates wherein the coal exhibits reduced sulfur and ash content.

An amount of conditioning agent is employed which promotes the separation of pyrite from coal. Generally, from about 0.01% to 15%, preferably from about 0.5% to 5%, by weight of coal, of conditioning agent is employed.

Preferably the amount of conditioning agent is based on the ash content of the coal. From about 0.05% to 30%, preferably 0.05% to 10%, and most preferably from about 1% to 10%, by weight, ash is employed.

Preferably, the coal is contacted with the conditioning agent in aqueous medium. The contacting is carried out at a temperature such to modify or alter the pyrite surface characteristics. For example, temperatures in the range of about 0° C. to 100° C. can be employed, preferably from about 50° C. to about 100° C., and still more preferably from about 20° C. to about 35° C., i.e., ambient conditions. Temperatures above 100° C. can be employed, but are not generally preferred since a pressurized vessel would be acquired. Temperatures in excess of 100° C. and pressures above atmospheric, generally pressures of from about 5 psig to about 500 psig, can be employed, however, and can even be preferred when a processing advantage is obtained. Elevated temperatures can also be useful if the viscosity and/or pour point of the agglomerating oil employed is too high at ambient temperatures to selectively agglomerate coal as opposed to ash and pyrites.

Examples of useful conditioning agents include inorganic compounds which can hydrolyze in water, preferably under the conditions of use, and the hydrolyzed forms of such inorganic compounds, preferably, such forms which exist in effective amounts under the condition of use. Proper pH and temperature are necessary for some inorganic compounds to exist in hydrolyzed form. When this is the case, such proper conditions are employed. The inorganic compounds which are hydrolyzed or exist in hydrolyzed form under the given conditions of contacting (e.g., temperature and pH) can modify or alter the existing surface characteristics of the pyrite. Preferred inorganic compounds are those which hydrolyze to form high surface area inorganic gels in water, such as from about 5 square meters per gram to about 1000 square meters per gram.

Examples of such conditioning agents are the following:

I. Metal Oxides and Hydroxides having the formula:

$$M_aO_b.xH_2O \text{ and } M(OH)_c.xH_2O,$$

wherein M is Al, Fe, Co, Ni, Zn, Ti, Cr, Mn, Mg, Pb, Ca, Ba, In or Sb; a, b and c are whole numbers depending on the ionic valence of M, and x is from 0 to about 3.

Preferably M is a metal selected from the group consisting of Al, Fe, Mg, Ca and Ba. These metal oxides and hydroxides are known materials. Particularly preferred are aluminum hydroxide gels in water at pH 7 to 7.5. Such compounds can be readily formed by mixing aqueous solutions of water soluble aluminum compounds, for example, aluminum nitrate or aluminum acetate, with suitable hydroxides, for example, ammonium hydroxide. In addition, a suitable conditioning agent is formed by hydrolyzing bauxite ($Al_2O_3.xH_2O$) in alkaline medium to an alumina gel. Calcium hydroxide represents another preferred conditioning agent. Calcined calcium and magnesium oxides are also preferred conditioning agents. Mixtures of such compounds can very suitably be employed. The compounds are preferably suitably hydrolyzed prior to contacting with coal particles in accordance with the invention.

II. Metal aluminates having the formula:

$$M'_d(AlO_3)_e \text{ or } M'_f(AlO_2)_g,$$

wherein M' is Fe, Co, Ca, Mg, Ba, Ni, Pb or Mo; and d, e, f, and g are whole numbers depending on the ionic valence of M.

Compounds wherein M' is Ca or Mg, i.e., calcium aluminates and magnesium aluminates are preferred. These preferred compounds can be readily formed by mixing aqueous solutions of water soluble calcium and magnesium compounds, for example, calcium or magnesium acetate with sodium aluminate. Mixtures of metal aluminates can very suitably be employed. The compounds are most suitably hydrolyzed prior to contacting with coal particles in accordance with the invention.

III. Aluminasilicates having the formula:

$$Al_2O_3.xSiO_2$$

wherein x is from about 0.5 to 5.

A preferred aluminasilicate conditioning agent for use herein has the formula $$Al_2O_3.4SiO_2.$$

Suitably aluminasilicates for use herein can be formed by mixing together in aqueous solution a water soluble aluminum compound, for example, aluminum acetate, and a suitable alkali metal silicate, for example, sodium metasilicate, preferably, in suitable stoichiometric amounts to provide preferred compounds set forth above.

IV. Metal silicates wherein the metal is calcium, magnesium, tin, barium or iron.

Metal silicates can be complex mixtures of compounds containing one or more of the above mentioned metals. Such mixtures can be quite suitable for use as conditioning agents.

Calcium and magnesium silicates are among the preferred conditioning agents of this invention.

These conditioning agents can be prepared by mixing appropriate water soluble metal materials and alkali metal silicates together in an aqueous medium. For example, calcium and magnesium silicates, which are among the preferred conditioning agents, can be prepared by adding a water soluble calcium and/or magnesium salt to an aqueous solution or dispersion of alkali metal silicate.

Suitable alkali metal silicates which can be used for forming the preferred conditioning agents are potassium silicates and sodium silicates. Alkali metal silicates for forming preferred calcium and magnesium conditioning agents for use herein are compounds having $SiO_2:M_2O$ formula weight ratios up to 4:1, wherein M represents an alkali metal, for example, K or Na.

Alkali metal silicate products having silica-to alkali weight ratios ($SiO_2:M_2O$) up to about 2 are water soluble, whereas those in which the ratio is above about 2.5 exhibit less water solubility, but can be dissolved by steam under pressure to provide viscous aqueous solutions or dispersions.

The alkali metal silicates for forming preferred conditioning agents are the readily available potassium and sodium silicates having an $SiO_2:M_2O$ formula weight ratios up to 2:1. Examples of specific alkali metal silicates are anhydrous $Na_2SiO_3$ (sodium metasilicate), $Na_2Si_2O_5$ (sodium disilicate, $Na_4SiO_4$ (sodium orthosilicate), $Na_6Si_2O_7$ (sodium pyrosilicate) and hydrates, for example, $Na_2SiO_3.nH_2O$ (n=5,6,8 and 9), $Na_2Si_4O_9.7H_2O$ and $Na_3HSiO_4.5H_2O$. Examples of suitable water soluble calcium and magnesium salts are calcium nitrate, calcium hydroxide and magnesium nitrate. The calcium and magnesium salts when mixed with alkali metal silicates described hereinbefore form very suitable conditioning agents for use herein.

Calcium silicates which hydrolyze to form tobermorite gels are especially preferred conditioning agents for use in the process of the invention.

V. Inorganic Cement Materials.

Inorganic cement materials are among the preferred conditioning agents of the invention. As used herein, cement material means an inorganic substance capable of developing adhesive and cohesive properties such that the material can become attached to mineral matter. Cement materials can be discrete chemical compounds, but most often are complex mixtures of compounds. The most preferred cements (and fortunately, the most readily available cements) are those cements capable of being hydrolyzed under ambient conditions which are the preferred conditions of contacting with the coal in the process.

These preferred cement materials are inorganic materials which when mixed with a ratio of water to form a paste can set and harden. Cement and materials used to form cements are discussed in Kirk-Othmer, Encyclopedia of Chemical Technology, 2D. Ed., Vol. 4 c. 1964 by John Wiley & Sons, Inc., Pages 684 to 710 being incorporated by reference herein. Examples of cement materials include calcium silicates, calcium aluminates, calcined limestone and gypsum. Especially preferred examples of cement materials are the materials employed in hydraulic limes, natural cement, masonry cement, pozzolan cement and portland cement. Such materials will often include magnesium cations in addition to calcium.

Commercial cement materials, which are very suitable for use herein, are generally formed by sintering calcium carbonate (as limestone), or calcium carbonate (as limestone) with aluminum silicates (as clay or shale). Preferably, such materials are hydrolyzed prior to use as conditioning agents.

With some coals, the material matter associated with the coal may be such that on treatment under proper conditions of temperature and pH the mineral matter can be modified in situ to provide the suitable hydrolyzed inorganic conditioning agents for carrying out the process. In such cases, additional conditioning agents may or may not be required depending on whether an effective amount of conditioning agent is generated in situ.

The conditioning agents suitable for use herein can be employed alone or in combination.

The coal particles are preferably contacted with the conditioning agent in an aqueous medium by forming a mixture of the coal particles, conditioning agent and water, and the conditioned coal particles are subsequently agglomerated with oil in accordance with this invention.

Suitable conditioning agents are disclosed in U.S. patent application Ser. No. 944,452, filed Sept. 21, 1978 commonly assigned, the entire content being incorporated by reference herein.

The coal-oil agglomerates of the invention reduced in oil content, and preferentially beneficiated can be recovered in a variety of ways.

Preferably the recovery is a separation effected by taking advantage of the size difference between coal-oil agglomerates and unagglomerated mineral matter. For example, the coal-oil agglomerates can be separated from the water and liberated ash and pyrite, etc., by filtering with bar sieves or screens, which predominately retain the coal-oil agglomerates, but pass water and unagglomerated mineral matter. When this technique is employed, coal-oil agglomerates of a size suitable for ready filtering should be formed.

Often it is desired to use small amounts of oil to form coal-oil agglomerates. Small amounts of oil, however, provide small coal-oil agglomerates. Small coal-oil agglomerates (aggregates and flocs) can be more desirably separated by taking advantage of the different surface characteristics of the coal-oil agglomerates, and ash and conditioned pyrite, for example, employing froth flotation and/or skimming techniques.

The process of this invention provides coal-oil agglomerates reduced in hydrocarbon oil content which are suitable for separation using any of these techniques. The desirable result is that reduced amounts of hydrocarbon oil can employed in beneficiating coal. A notable advantage is that selectivity of ash and pyrite rejection is maintained, or even improved, employing reduced amounts of hydrocarbon oil in accordance with this invention.

All parts and percents herein are by weight unless otherwise specified.

The following examples are provided to better illustrate the invention by presenting several specific embodiments of the process of the invention.

EXAMPLE I

Upper Freeport, Kingwood Mine coal containing ash and iron pyrite mineral matter is ground and screened to provide a quantity of feed coal having a particle size of minus 80 mesh and on 100 mesh.

A 10 gram portion of the coal particles is slurried in a beaker with 500 ml. of water at room temperature and stirred with a high speed stirrer for 15 minutes. With continued stirring, 12%, by weight of coal, of hydrodesulfurized light cycle oil is slowly added to the coal water mixture. When the light cycle oil is added, the coal particles began to agglomerate, forming coal-oil agglomerates. Stirring is continued until agglomeration is essentially complete. The contents of the beaker were then poured onto a 40 mesh screen to recover the coal-oil agglomerates. The coal-oil agglomerates were washed with water.

These recovered coal-oil agglomerates are slurried in a beaker with 250 ml. of water, and an additional 10 gram portion of coal particles slurried in 250 ml. water is added to the beaker. This mixture is stirred with a high speed stirrer. Stirring is continued until substantially all of the coal particles are associated into coal-oil agglomerates. The contents of the beaker are then poured onto a screen to separate the coal-oil agglomerates and water. The resulting coal-oil agglomerates are coal-oil agglomerates reduced in oil content formed by the process of the invention.

The coal in these coal-oil agglomerates is beneficiated in that the coal is reduced in ash content.

EXAMPLE II

The procedure set forth in Example I is repeated except that there is added to both slurries of coal particles and water calcium acetate and sodium metasilicate to form calcium silicate (a conditioning agent) in situ. The quantities of calcium acetate and sodium metasilicate added were such that the ratio of calcium to silicate was 1:1 and the quantity of calcium silicate was 5.8% by weight of coal.

When this procedure is employed, the coal is particularly beneficiated in that the coal in the coal-oil agglomerates is substantially reduced in both ash and iron pyrite mineral matter. These coal-oil agglomerates can be an excellent low ash, low sulfur fuel.

If desired, these coal-oil agglomerates can be de-oiled by washing the coal-oil agglomerates with a hydrocarbon oil solvent (e.g., toluene and hexane) to remove the hydrocarbon oil and recover a beneficiated coal product of reduced pyritic sulfur and ash content.

While this invention has been described with respect to various specific examples and embodiments, it is to be understood that the invention is not limited thereto and that it can be variously practiced within the scope of the following claims.

The embodiments of the invention in which an exclusive property or privilege is claimed and defined are as follows:

1. A method for reducing the amount of oil required to form coal-oil agglomerates comprising the steps of:
   (a) forming a slurry of water and coal particles;
   (b) contacting the slurry with an amount of hydrocarbon oil to form coal-oil agglomerates;
   (c) contacting said agglomerates with an additional amount of coal particles to form coal-oil agglomerates of a desired size consist; and
   (d) recovering coal oil agglomerates of reduced oil content.

2. The method of claim 1 wherein the coal particle size is minus 24 mesh on 300 mesh.

3. The method of claim 1 wherein the hydrocarbon oil is selected from the group consisting of light cycle oil, heavy cycle oil, heavy gas oil, clarified oil, kerosene, heavy vacuum gas oil, residual oils, coal tar and other coal derived oils.

4. The method of claim 3 wherein the recovered coal-oil agglomerates reduced in oil content have from about 3% to 25% by weight coal of hydrocarbon oil.

5. A process for beneficiating coal comprising the steps of:
   (1) forming an aqueous slurry of coal particles containing ash and iron pyrite mineral matter, and hydrocarbon oil;
   (2) agitating the slurry to form coal-oil agglomerates;
   (3) recovering coal-oil agglomerates wherein the coal has reduced mineral content;
   (4) forming a mixture of the recovered coal-oil agglomerates, water and an additional amount of coal particles containing ash and iron pyrite mineral matter;
   (5) agitating the mixture to form coal-oil agglomerates reduced in mineral content; and
   (6) recovering coal-oil agglomerates wherein the coal has reduced mineral content.

6. The process of claim 5 wherein steps 4 and 6 are repeated.

7. The process of claim 6 wherein steps 4 to 6 are successively repeated 1 to 5 times.

8. The process of claim 5 wherein the coal particles containing ash and iron pyrite mineral matter are contacted with a promoting amount of at least one conditioning agent capable of modifying or altering the existing surface characteristics of the pyrite under conditions to effectuate alteration or modification of at least a portion of the contained pyrite, and recovering coal-oil agglomerates wherein the coal reduced iron pyrite and mineral content.

9. The process of claim 5 wherein the hydrocarbon oil is selected from the group consisting of light cycle oil, heavy cycle oil, heavy gas oil, clarified oil, kerosene, heavy vacuum gas oil, residual oils, coal tar and other coal derived oils.

10. The process of claim 5 wherein the recovered coal-oil agglomerates have from about 3% to 25%, by weight of coal, of hydrocarbon oil.

11. The process of claim 8 wherein the recovered coal-oil agglomerates have from about 3% to 25%, by weight of coal, of hydrocarbon oil.

* * * * *